United States Patent [19]

Dey et al.

[11] Patent Number: 5,020,905
[45] Date of Patent: Jun. 4, 1991

[54] APPLICATION OF THE FOUCAULT KNIFE-EDGE TEST TO A SEGMENTED OPTIC

[75] Inventors: Thomas W. Dey, Springwater; Edward M. Granger, Rochester; Donald E. Vandenberg, Brockport; John G. Pitek; William D. Humbel, both of Rochester, all of N.Y.

[73] Assignee: Eastman Kodak Company, Rochester, N.Y.

[21] Appl. No.: 485,413

[22] Filed: Feb. 27, 1990

[51] Int. Cl.⁵ .................................................. G01B 9/00
[52] U.S. Cl. ..................................................... 356/124
[58] Field of Search ............... 356/124, 125, 126, 127, 356/129

[56] References Cited

U.S. PATENT DOCUMENTS 4,272,190  6/1981  Shapiro .............................. 356/124

Primary Examiner—F. L. Evans
Attorney, Agent, or Firm—Stephen C. Kaufman

[57] ABSTRACT

The Foucault knife-edge test has been traditionally employed for testing a monolithic imaging device, for example, a mirror, to ascertain its characteristics, for example, whether or not it is a source of optical aberrations. The present invention, in contrast to the traditional Foucault employment, discloses a Foucault testing of a segmented optic, thereby significantly extending the utility of the Foucault test.

6 Claims, 2 Drawing Sheets

SECTION A-A

APPLICATION OF THE FOUCAULT KNIFE-EDGE TEST TO A SEGMENTED OPTIC

CROSS REFERENCE TO RELATED APPLICATIONS

This application is related to U.S. Application Ser. No. 07/464,278 filed Jan. 12, 1990, by Vandenberg et al; to U.S. Application Ser. No. 07/464,042 filed Jan. 12, 1990 by Pitek et al; and, to U.S. Application Ser. No. 07/485,182 filed Feb. 27, 1990 by Humbel et al, which is being filed contemporaneously with this application. The entire disclosures of all of these applications are incorporated by reference herein. Each of these applications is copending and commonly assigned.

FIELD OF THE INVENTION

This invention relates to a method for testing imaging devices.

INTRODUCTION TO THE INVENTION

As disclosed in the above referenced applications, a Foucault knife-edge test has been traditionally understood to be perhaps the classic optical test for an objective, or imaging device.

Attention is directed to FIG. 1, which shows a typical optical assembly 10 for demonstrating the basic principles of the Foucault knife-edge test. The assembly 10 includes a conventional imaging device, i.e., a lens 12, the lens 12 comprising a pair of optical surfaces 14 and 16; a radiation source 18; a collector lens 20; and a conventional photodetector 22. The components of the assembly 10 are aligned to a reference axis 24.

For this optical assembly 10, one may employ the knife-edge test for detecting (at the photodetector 22) the presence of transverse aberrations that may have been introduced into the assembly 10 by the lens optical surfaces 14, 16. Accordingly, a knife-edge 26 may be gradually introduced into the assembly 10, so that the knife-edge 26 sequentially cuts and blocks the image of the radiation source 18 at a plane of convergence 28. This action, in turn, removes source rays from their expected trajectories, so that a variable intensity pattern may be registered at the photodetector 22. Finally, a comparison of this intensity pattern with a theoretical intensity pattern for an ideal optical surface, can become a measure of the presence of transverse aberrations introduced by the optical surfaces 14, 16.

SUMMARY OF THE INVENTION

To the end of significantly enhancing the utility and precision measurement of the Foucault knife-edge test, just summarized, our referenced applications disclose a novel optical element suitable for employment in the Foucault knife-edge test. In particular, the novel optical element comprises a transparent substrate, and a coating material that can adhere to at least a portion of the transparent substrate, thereby forming at least one knife-edge pattern. The novel optical element, as defined, provides a significant and advantageous alternative to an historic and traditional employment of a knife-edge comprising a discarded metal razor blade. The advantages include enhanced testing sensitivity, and precision measurement in ascertaining the optical characteristics, for example, the sphericity, of the imaging device 12.

In the present invention, we continue our efforts to enhance the utility and precision of the Foucault knife-edge test. In particular, we have recognized, firstly, that the Foucault knife-edge test has been traditionally applied to only a monolithic or discrete imaging device. For example, structurally, the imaging device has heretofore invariantly comprised only a monolithic lens, or only a monolithic mirror, or only a monolithic diffraction grating. Correspondingly, and functionally, the traditional imaging device has heretofore defined only a non-disjoint, or contiguous entrance pupil, with respect to the assembly 10.

We emphasize "monolithic" since, in sharp contrast to this traditional, and limited, application of the Foucault test, we now disclose the application of the Foucault test, to a segmented optic. For purposes of the present invention, we define a segmented optic as an optical assembly comprising at least two physically de-coupled monolithic imaging devices, wherein an individual and disjoint entrance pupil contribution by each of the physically de-coupled imaging devices, can aggregate to form, in sum, a common entrance pupil for the assembly. A first example of a segmented optic is a segmented mirror comprising at least 2 discrete mirror segments. A second example of a segmented optic is an optical assembly comprising a discrete lens, and a discrete mirror, the lens and the mirror defining a common entrance pupil for the assembly.

It can be theorized, in hindsight and with the advantage of the present disclosure, that one reason for the historic application of the Foucault test to only a monolithic imaging device, is that imaging optical assemblies comprising segmented optics are relatively new. A second reason, again in hindsight and with the advantage of the present disclosure, is that one cannot merely "substitute", in the Foucault test, a segmented optic for a monolithic imaging device. This is because the Foucault test may lose its inherent advantages of precision measurement, if applied blindly to a segmented optic, unless, as we have done, novel design techniques, including, for example, our novel optical knife-edge, and novel quantitative procedures, are employed in conjunction with the segmented optic.

The present invention, accordingly, comprises an improved Foucault knife-test, the test comPrising:

(1) providing an optical assembly, the optical assembly comprising:
(a) a segmented optic capable of imaging radiation;
(b) a source of radiation directed along a reference axis to the segmented optic; and
(c) a detection means aligned on the reference axis, for detecting the radiation imaged by the segmented optic; and (2) introducing a knife-edge into the optical assembly, for gradually cutting the radiation imaged by the segmented optic, thereby producing a variable radiation pattern for detection by the detection means.

The present invention, as defined, has important advantages, since, for the first time, it extends all the virtues of the Foucault test to that of segmented optics. Further, the present invention solves a critical problem that has heretofore impeded analysis of segmented optics. This problem is that it is important to be able to sense rigid body misalignment of the segments, and intra-segment aberrations. However, previous to the present invention, workers skilled in this art would not have been able to use the Foucault test to sufficiently sense the indicated aberrations or misalignments. The present invention, on the other hand, may be readily employed to solve this problem.

BRIEF DESCRIPTION OF THE DRAWING

The invention is illustrated in the accompanying drawing, in which.

DETAILED DESCRIPTION OF THE INVENTION

As summarized above, the segmented optic of the present invention, by definition, comprises at least two physically de-coupled, monolithic imaging devices, wherein an individual and disjoint entrance pupil contribution by each of the physically de-coupled imaging devices, aggregates in sum to form a common entrance pupil. Accordingly, examples of a segmented optic that can be included within the definition, are manifold.

Figures 1, 2:
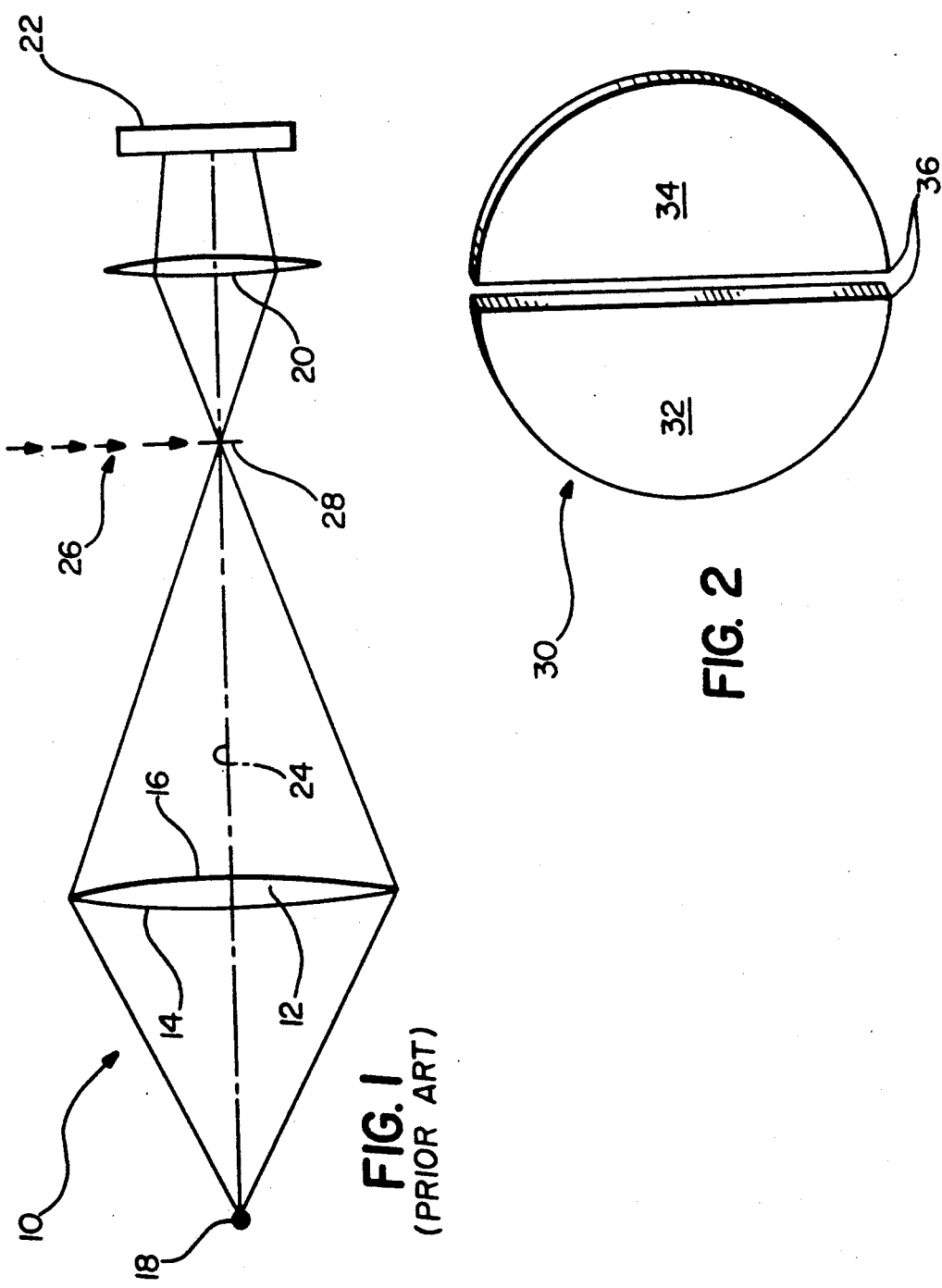
FIG. 1 (prior art) shows an optical assembly for using the Foucault knife-edge test.
FIG. 2 shows a segmented optic comprising a segmented mirror, that can be tested by the FIG. 1 optical assembly.

Thus, as FIG. 2 exemplifies, a segmented optic 30 can include a segmented mirror comprising two physically de-coupled, monolithic mirror sections 32, 34. An individual and disjoint entrance pupil contribution by each of the physically de-coupled, monolithic mirror sections 32, 34, aggregates in sum to form a common entrance pupil 36 i.e., the entrance pupil 36 is developed over the entire surface of the segmented optic 30.

The FIG. 2 segmented optic 30, more particularly, may comprise conventional mirror section materials, and in particular, for our preferred applications, may comprise an aluminized reflective coating on a pyrex glass substrate. Here, the segmented optic 30 has an overall diameter of approximately 125 mm, and a radius of curvature of approximately 2000 mm.

The Foucault testing of the FIG. 2 segmented optic 30 can proceed, with reference to the FIG. 1 assembly 10, mutatis mutandis, the required necessary changes being that of (1) replacing the FIG. 1 lens 12, with that of the FIG. 2 segmented optic 30, and (2) re-locating the radiation source 18 to accommodate the reflective properties of the mirror sections 32, 34. Note that it is also possible to include a radiation source 18 comprising an extended source, for example, an extended source comprising 55 micron diameter disc of tungsten halogen light, whose color temperature is 3200° Kelvin; and, that a preferred knife-edge comPrises our novel optical element disclosed in U.S. Application Ser. No. 07/464,042.

Continuing, the Foucault testing of the FIG. 2 segmented optic 30 works to the end of reconstructing, or emulating, an idealized monolithic mirror, by using Foucault determined data derived from the sections 32, 34, to thus align them into correspondence with the idealized, monolithic mirror. Note that the Foucault determined data may be qualitative (for example, when the FIG. 1 photodetector 22 comprises the human eye). It is possible that the segmented optic 30 may induce an intensity pattern at the eye, which intensity pattern has inherent ambiguities, namely, the ambiguity as to which of the two mirror sections 32, 34 is indeed the source of an optical aberration. For this situation, one may preferably employ the quantitative Foucault techniques disclosed in the above-referenced U.S. Application Ser. No. 07/485,182, to thus address and resolve the indicated ambiguity problem.

Figure 3A:
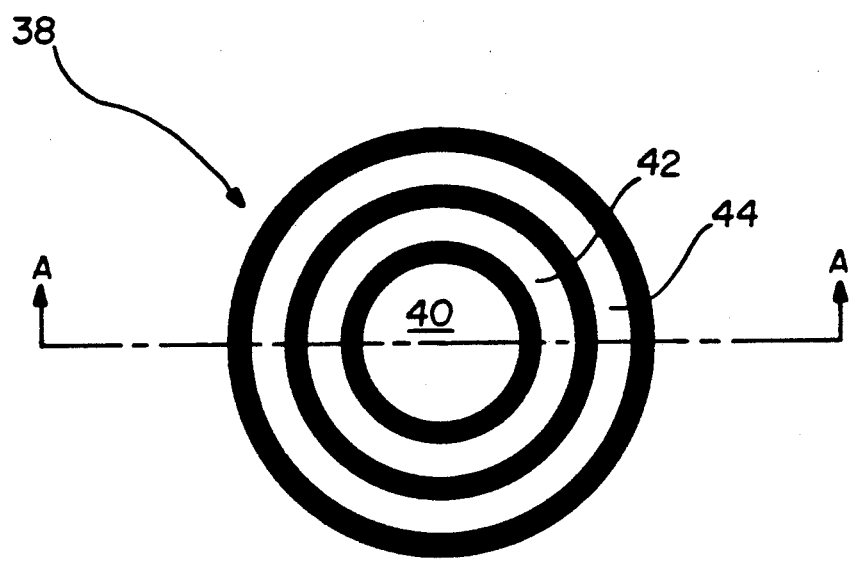
FIGS. 3A-B show a segmented optic comprising a portion of a telescope, which segmented optic can be tested by the FIG. 1 optical assembly.
Figure 3B:
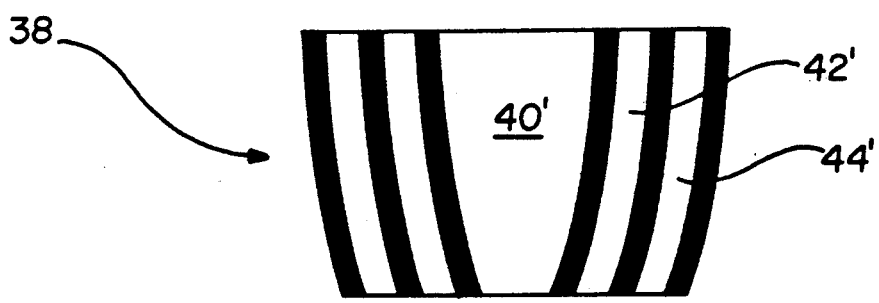

Attention is now directed to FIGS. 3A, B, which show cross-sectional and top views, respectively, of another segmented optic 38 that can be employed in the improved Foucault method of the present invention. The segmented optic 38 comprises a portion of an advanced X-ray astronomical telescope. In particular, the segmented optic 38 comprises a set of parabolically shaped, cylindrically nested, physically de-coupled mirror segments 40, 42, 44. The mirror segments can cooperate to function as a grazing incident reflecting optical assembly. The mirror segments 40, 42, 44 each preferrably comprise ULE glass. As shown in FIG. 3B, the physically de-coupled mirror segments 40, 42, 44 can aggregate in sum to form a common entrance pupil 40', 42', 44'.

Similar to the argument presented above with respect to the FIG. 2 segmented optic 30, the telescope segmented optic 38 can be tested in the FIG. 1 assembly 10, by now replacing the segmented optic 30, with the segmented optic 38. Here, the Foucault test may be employed to the end of aligning each mirror segment 40, 42, 44, with respect to each other, or with respect to the FIG. 1 reference axis 24, or for ascertaining the overall optical quality of the segmented optic 38.

We claim:

1. An improved Foucault knife-test, the test comprising:
   (1) providing an optical assembly, the optical assembly comprising:
      (a) A segmented optic capable of imaging radiation; the optic comprising at least two physically decoupled rigid body monolithic imaging devices having respective individual and disjoint entrance pupil contributions aggregated in sum to form a common entrance pupil;
      (b) a source of radiation direction along a reference axis to the segmented optic; and
      (c) a detection means aligned on the reference axis, for detecting the radiation imaged by the segmented optic;
   (2) introducing a knife-edge into the optical assembly, for gradually cutting the radiation imaged by the segmented optic, thereby producing a variable radiation pattern for detection by the detection means; and
   (3) aligning the rigid body devices, using the detected variable radiation pattern to emulate a monolithic optic having a non-disjoint and contiguous single entrance pupil.

2. A test according to claim 1, wherein; in the step of providing, the segmented optic comprises a discrete lens and a discrete mirror, the lens and mirror defining a common entrance pupil for the optical assembly.

3. A test according to claim 1, wherein; in the step of providing, the segmented optic comprises at least two nested, physically decoupled mirror segments.

4. A test according to claim 1, further comprising:
   (4) comparing the variable radiation intensity pattern with a known theoretical variable radiation intensity pattern to determine the presence of intra-segment transverse aberrations for the rigid body devices.

5. An improved Foucault knife-test, the test comprising:

(1) providing an optical assembly, the optical assembly comprising:
  (a) A segmented optic capable of imaging radiation; the optic comprising at least two physically decoupled rigid body monolithic imaging devices having respective individual and disjoint entrance pupil contributions aggregated in sum to form a common entrance pupil;
  (b) a source of radiation directed along a reference axis to the segmented optic; and
  (c) a detection means aligned on the reference axis, for detecting the radiation imaged by the segmented optic;
(2) introducing a knife-edge into the optical assembly, for gradually cutting the radiation imaged by the segmented optic, thereby producing a variable radiation pattern for detection by the detection means;
(3) determining misalignment of the decoupled imaging devices using the detected variable radiation pattern; and
(4) aligning the decoupled imaging devices into correspondence with an idealized single rigid body monolithic imaging device having a nondisjoint and contiguous entrance pupil.

6. A test according to claim 5, further comprising:
(5) determining intra-segment aberrations of the decoupled imaging devices through comparison of the variable radiation intensity pattern with a known theoretical variable radiation intensity pattern.

* * * * *

UNITED-STATES PATENT AND TRADEMARK OFFICE
CERTIFICATE OF CORRECTION

PATENT NO. : 5,020,905
DATED : June 4, 1991
INVENTOR(S) : Thomas W. Dey et al.

It is certified that error appears in the above-identified patent and that said Letters Patent is hereby corrected as shown below:

Col. 2, line 44    delete "comPrising" and substitute therefor --comprising--;

Col. 3, line 52    delete "comPrises" and substitute therefor --comprises--.

Signed and Sealed this

Twenty-second Day of December, 1992

Attest:

DOUGLAS B. COMER

*Attesting Officer*    *Acting Commissioner of Patents and Trademarks*